United States Patent
Ammons

(10) Patent No.: US 7,275,892 B2
(45) Date of Patent: Oct. 2, 2007

(54) TOOL AND METHOD FOR INSTALLATION OF WATER PIPE

(76) Inventor: James Ammons, 2433 Guilbeau La., Seabrook, TX (US) 77586

( * ) Notice: Subject to any disclaimer, the term of this patent is extended or adjusted under 35 U.S.C. 154(b) by 117 days.

(21) Appl. No.: 11/217,506

(22) Filed: Sep. 1, 2005

(65) Prior Publication Data
US 2007/0048092 A1    Mar. 1, 2007

(51) Int. Cl.
 *F16L 1/028* (2006.01)
(52) U.S. Cl. .................... 405/184; 405/174; 405/154.1
(58) Field of Classification Search ............. 405/154.1, 405/174, 184, 245; 173/90; 227/147; 175/22, 175/23
See application file for complete search history.

(56) References Cited

U.S. PATENT DOCUMENTS 51,801 A * 1/1866 Castle .......................... 175/23
790,910 A * 5/1905 McClintock ................. 405/245
3,916,564 A * 11/1975 Crowell, Sr. .................. 175/23

FOREIGN PATENT DOCUMENTS

EP    0 294 740    * 12/1988

OTHER PUBLICATIONS

Li, Richard "Installing an Irrigation System? Consider Boring", p. 2; Paragraphs 2-4, undated.

* cited by examiner

*Primary Examiner*—Frederick L. Lagman
(74) *Attorney, Agent, or Firm*—Buskop Law Group, PC; Wendy Buskop

(57) ABSTRACT

A tool used for installing water systems. The tool consists of a probe having a central body, a tapered end, and an anvil end. Pipe is slid over the central body forming a pipe and probe assembly which can be installed in soil traversing beneath an immovable structure by impacting the anvil end, such as with a jack hammer. A method for installing water systems using the tool is also contemplated herein.

33 Claims, 6 Drawing Sheets

TOOL AND METHOD FOR INSTALLATION OF WATER PIPE

FIELD

The present embodiment relate to handheld tools for use in connection with the installation of pipe under immovable objects and then connection of the pipe to water systems. The tools have utility in connection with positioning pipe, such as for water systems under a hard structure without having to remove the hard structure.

BACKGROUND

Water systems have long been proved to be an effective and efficient means for watering landscaping, especially in hot, dry climates. Often in places of residence such as a house, a driveway, a walkway or some other hard structure that already exists which makes placement of new water lines difficult, as they need to be buried in the earth.

The use of water systems conserve water use particularly in desert climates in locations like Tucson and Phoenix, Ariz.; placing water under the surface of the soil reduces the rate of evaporation. In addition, when water systems can be used, they reduce plant damage as opposed to conventional sprinkler systems where water is sprayed on the foliage causing the burning of wet foliage in severe heat and sun situations. Installing an water system in land where houses and other structures are already in place is difficult. Accordingly, these houses and pre-existing dwellings have higher water usage than new homes, which can have water systems installed before immovable structures are built on the land.

A need exists for a tool and a method to install a water pipe which is fast, easy to use, and works with preexisting structures that are immovable, such as preexisting sidewalks, driveways, and other similar structures.

Conventional installation of underground water systems involve placing a main conduit with secondary conduits branching out from the main conduit into the ground to deliver water to a desired area. Various methods and devices have been used to put the conduits and their branches in the ground but these methods and devices require motorized boring instruments and drills that produce safety hazards for a worker in the installation process and which create noise pollution for other neighborhood residents.

A need exists for a hand-held device that could be used to easily install pipe for water systems of a consistent, correct diameter to which a water system can be connected either by welding or by installing water tubing through the pipe.

A need exists for a new and improved water system installation method that can install a water pipe under a hard structure and be manually operated.

The present embodiments meet these needs.

BRIEF DESCRIPTION OF THE DRAWINGS

The detailed description will be better understood in conjunction with the accompanying drawings as follows.

Figure 1A:
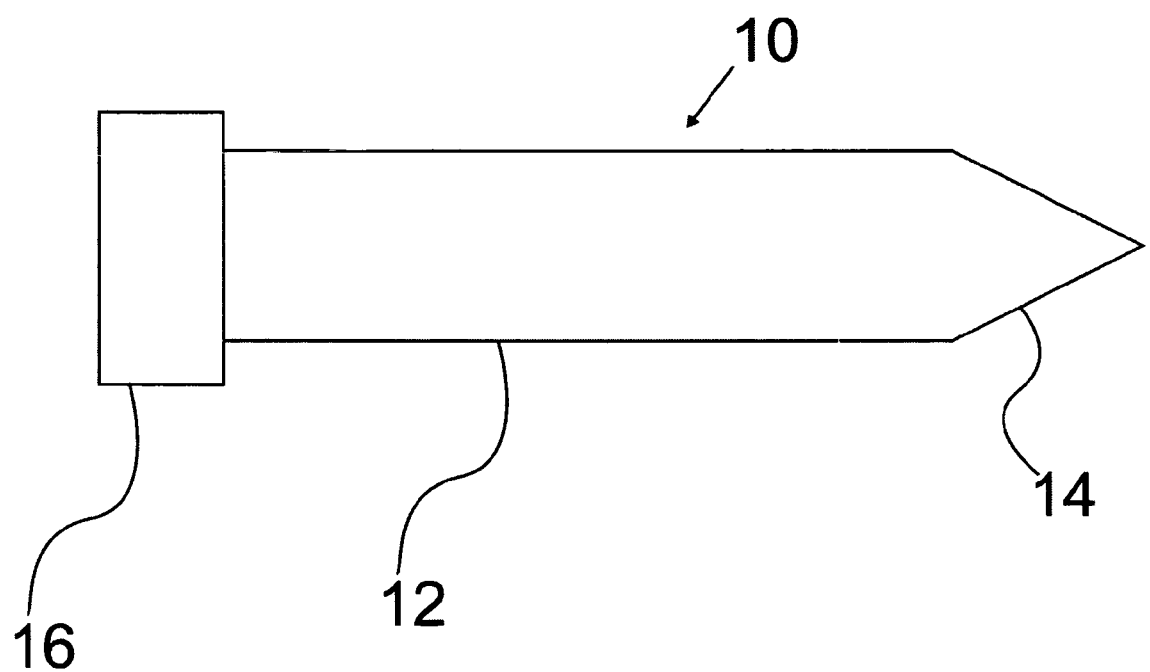
FIG. 1A depicts a top view of an embodiment of a tool in a position ready for use in an installation.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments are new and improved tools that can easily and consistently install generally inflexible tubing beneath hard structures for water systems. The hard structures are contemplated to be immovable structures, such as concrete walkways, concrete driveways, water pipes, sewer pipes, portions of houses, portions of garages, fencing or other immovable structures.

The tool is designed to enable installation of pipe under the immovable structure by traversing beneath the immovable structure such that each end of the pipe is accessible from either side of the immovable structure.

The tool can be used to horizontally or vertically install pipe without effecting the immovable structure.

Types of immovable structures that this tool can be used to install around, which includes traversing beneath the structures, include driveways, roadways, portions of a house, or another already installed pipe.

The tool is made of a probe with a central body having a tapered end and an anvil end. Pipe for installation is slid over the central body of the probe forming a tight fitting sleeve. The assembled pipe and tool are placed in a pre-dug channel adjacent the immovable structure with the tapered end pointing beneath the immovable structure. The anvil end is impacted, such as with a packer, electrical or mechanical, pneumatic or hydraulic, and the probe with pipe is driven into the earth beneath the immovable structure, such as a concrete walkway. The probe is removed when the tapered end becomes visible or accessible on the end of the probe opposite the anvil end. The tool is pulled from the anvil end from the pipe, leaving the pipe in the ground traversing beneath the immovable structure, such as a concrete walkway. The water system is then welded to the ends of the pipe enabling a drip water system to be installed where previously no drip water system could be installed, and water is conserved.

The embodied methods save significant time in installing pipe. The methods save labor costs because the time to install a water pipe is dramatically reduced and the installation of a water pipe is made easier. By using these methods, common injuries that occur on the job using current boring techniques for installing a water system under immovable structures, such as under a concrete sidewalk, are prevented.

The present embodiments enable just one person to install a water pipe when at least two or three people are required for the installation with conventional techniques.

Another advantage of the present embodiment is that water is not needed to perform the install; power is not needed either.

The method contemplates creating a narrow trench which in fact stays dry, permitting a water pipe connection immediately after installation. In contrast to current techniques, wherein if boring is not done, high pressure water is used to create a trench, which is wasteful of the water supply, plus the wet trench has to dry out before the installed pipe can be connected. The present method not only shortens wait time, but more importantly, prevents the excessive use of water to create the narrow trench used in the method of installation.

The present embodiments method embodiment saves time during installation by at least 50% as the method does not require cleaning of the installed pipe, which occurs with common boring technology.

The present embodiment is dramatically less expensive than conventional boring because expensive drill bits, as required with a drill, are not needed with the process. Manual whacking of the anvil end with a sledge hammer will suffice for installation of the probe under the immovable structure. No gas powered packers are necessarily needed although they can be used for very large pipe with a large diameter probe.

This handheld tool can be used to enable secure placement of a water pipe without having to remove a hard structure.

The embodied methods contemplate that an installer can use a packer to pound the anvil side of the probe into the soil to form the installed pipe. A hydraulic packer can be used. Alternatively, a pneumatic packer, such as a jack hammer, can be used. Similarly, an electrical packer with a ram, or a hand held packer, like a sledge hammer can be used in different embodiments.

The benefit of this present embodiment is that hard structures such as concrete no longer need to be destroyed in order to install a water system. Previously, land owners with hard structures on their property would have to either go without an water system or destroy the hard structure just so that they could install a water system. The present embodiment solves this problem by providing a means to install a water system without the need of destroying hard structures.

The method specifically contemplates first digging a narrow trench. This narrow trench can be between 1 feet and 4 feet wide depending on the diameter of the probe used and the pipe to be installed. This narrow trench would be generally at an angle to the immovable structure to traverse beneath or across the immovable structure. For example, the trench can be at a 90° angle to the side of a concrete sidewalk to enable the installed pipe to traverse beneath the sidewalk.

Pipe is slide around the probe with the tapered end and anvil end forming an assembly. The anvil end of the assembly is repeatedly hit with a packer, such as a jack hammer, and in about 30 seconds, or maybe 1 minute, or possible even 15 seconds, the probe with pipe are installed beneath the immovable structure, such as the concrete walkway. The anvil end is then gripped, and the probe is pulled out from the pipe, leaving the pipe installed under the walkway. Water system piping can then be welded to either end of the pipe to complete a water system.

Figure 1B:
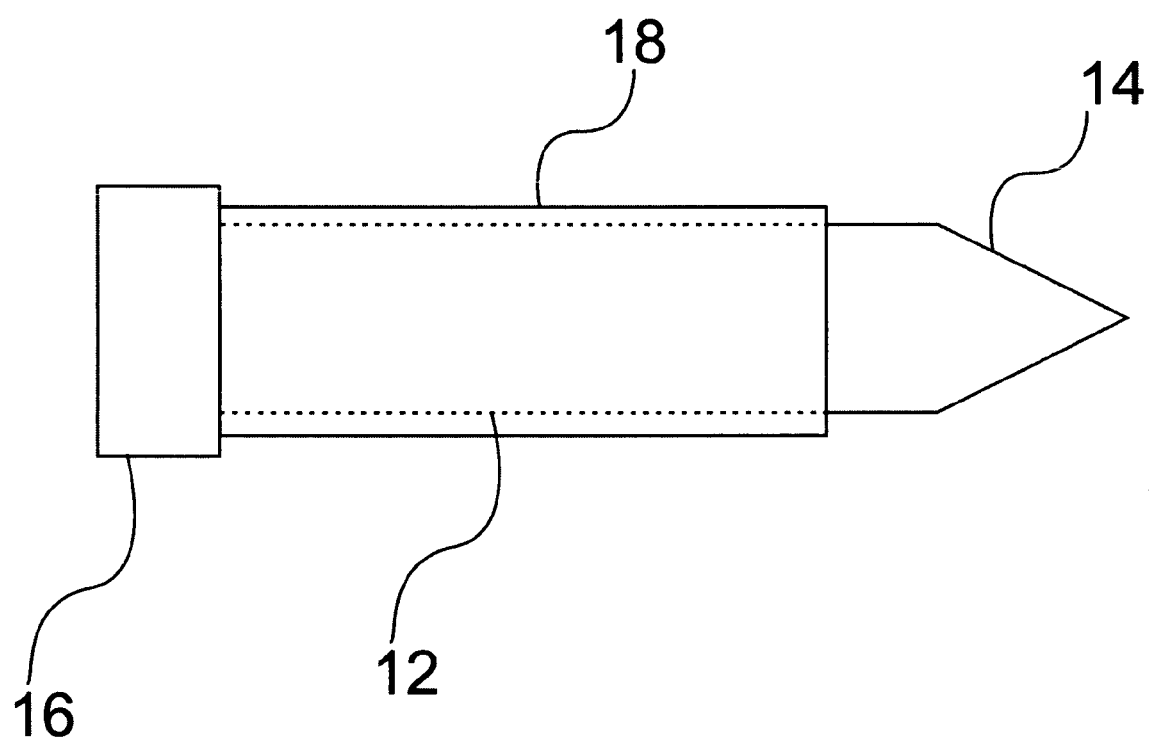
FIG. 1B depicts another embodiment of an embodiment of a tool for use in an installation.

Referring now to the drawings, FIG. 1A and FIG. 1B are embodiments of a tool. FIG. 1A depicts the probe and FIG. 1B depicts the probe and a pipe adapted to fit flush over the probe.

In FIG. 1A, the tool (10) is shown with a central body (12) a tapered end (14) and an anvil end (16). The anvil end has a diameter that extends beyond the diameter of the central body (12).

In FIG. 1B, the pipe (18) has only a slightly larger diameter than the probe and is slid over the central probe like a sleeve. The pipe (18) has a tight fit with the central body so that dirt and other particles can not pack into a gap between the pipe (18) and the central body (12).

Figure 1C:
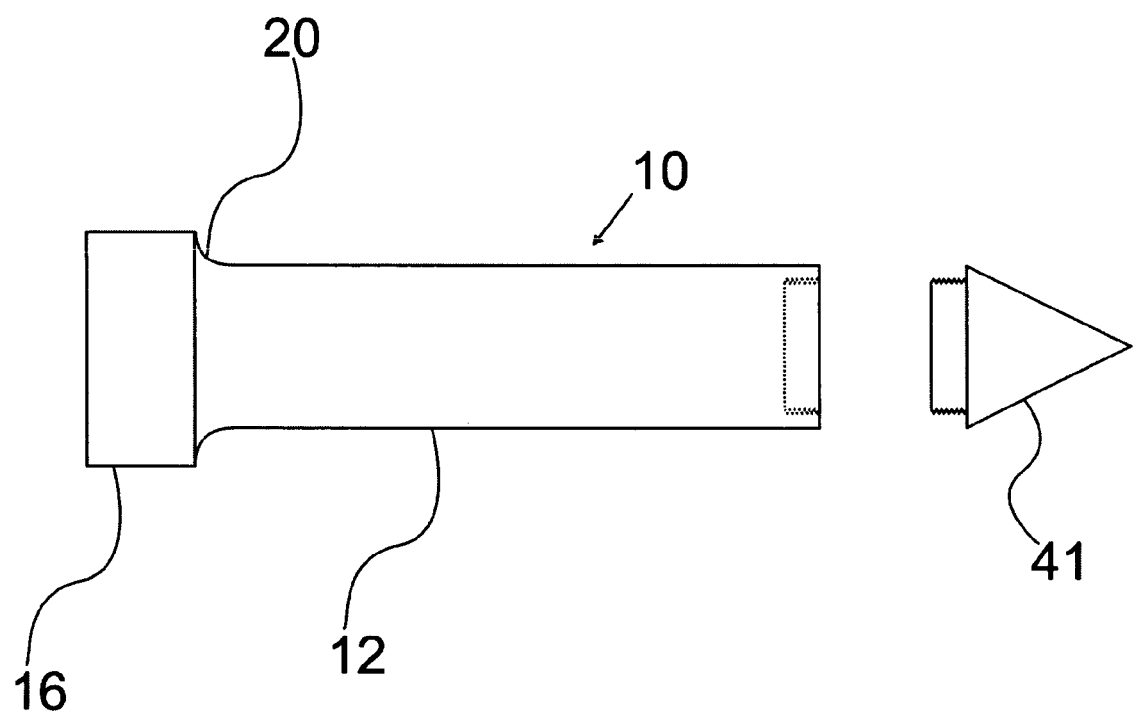
FIG. 1C depicts an exploded perspective view of an embodiment of a tool for use in an installation.

In FIG. 1C, the tool (10) has a central body (12) a removable tapered end (14) and an anvil end (16). In this embodiment, the central body has tapered shoulders (20) between the central body and the anvil end. The tapered prevent packing of dirt between the pipe and the anvil end.

The pipe (18) in one embodiment can be made of a polyvinyl chloride (PVC), another hard crystalline polymer such as a polyamide composite, or a metal, or a coated metal resistant to rusting and corrosion.

The pipe (18) can have a diameter between 0.5 inches and 2.5 inches, and a length of between 0.5 foot and 100 feet depending on the diameter of the pipe (18) used, the type of packer used, the characteristics of the soil through which the pipe (18) is installed and the needs of the landowner. For example, a long thin pipe with ¼ inch inner diameter and 80 feet long would be usable over a long, thin tool 90 feet long with a diameter only slightly less than the diameter of the pipe for an installation, while a fat pipe of 3 inch diameter might only be usable with a short fat tool having length of less than 4 feet.

The wall thickness of the pipe (18) can be between ¹⁄₁₆ inch to over 2 inches in thickness for most water uses, but this wall thickness can be varied depending on the needs of the landowner, the pressure in the pipe (18), or other specification such as being in an earthquake zone, needing to go through soil with bits of granite in it or depending on the type of packer being used to install the pipe (18).

In one embodiment, the present embodiment contemplates a 4.5 foot pipe with a 1 inch diameter of PVC and the tool (10) has a central body (12) with slightly smaller diameter than the pipe (18) with a slightly longer length, of about 5 feet from anvil end (16) to tapered end (14), wherein the pipe (18) creates tight fit around the central body (12).

For this embodiment, the anvil end (16) of the tool (10) is about 2.5 inches in diameter and has a thickness of 1.5 inches and the anvil end (16) is welded to the central body (12). The anvil end (16) can be made of stainless steel, and the central body (12) is made from carbon steel, a different material. In an alternative embodiment, the anvil end (16) and the central body (12) with a tapered portion can be made of the same material, cold rolled steel, iron, alloys thereof, or stainless steel. The anvil end (16) is secured to the central body (12) by a means other than by welding, still having a usable tool for installation purposes.

For this embodiment, the probe (10) can have a 1 inch tapered end (14) that tapers to a point using about a 20 degree slope. The tapered end (14) is made from the same material as the central body (12) in this embodiment. The tapered end (14) can be removable and re-installable to enable maintenance of the probe if the tapered end (14) became mangled. The central body (12) and tapered end (14) may be made of a high impact, ultraviolet resistant, non-corroding material comprising a polymer, a graphite, a ceramic or combinations thereof.

The tapered end (14) can be flat ended or tapered to a point. The tapered end can be made of a material different from the central body (12), such as a graphite composite, if the probe (10) needed to be pounded through a particularly hard rock. A diamond point can be installed, full of diamond chips, on the probe (10) for difficult soil penetration with high density.

The anvil end (16) for this embodiment is contemplated to be welded onto the central body (12) on one side and have a flat face on the side opposite the central body (12). The anvil end (16) with the flat face is of a thickness which enables the anvil end (16) to sustain repeated impacts of at least 20 pounds per square inch without deformation.

The probe (10) can be made of different metals, and different metal alloys, so long as the material is substantially non-deforming, and does not rust significantly and can take daily field use and exposure to weather.

The probe (10) can have a light coating disposed on the probe, or be painted, or otherwise coated to prevent degradation in the present of rain, sun, and friction damage.

In another embodiment, the probe (10) could have a coating of a material, such as of a white oil or an easily degradable non-toxic lubricant, such as a vegetable oil, to assist in the prevention of corrosion while enabling otherwise snug fitting piping to slide off the probe more easily after installation and pounding is complete.

The probe (10) can have a diameter of less than 1 inch in the central body (12) in a preferred embodiment.

The probe (10) can be constructed by welding the anvil end (16) to the central body (12) at an angle that is substantially perpendicular to the central body (12).

In another embodiment, the anvil end (16) can have tapered shoulders (20) to facilitate the probe's insertion into the earth or hard soil, and to survive pounding into the narrow trench traversing the immovable structure. These tapered shoulders (20) would enable dirt to flow away from the probe and not permit earth from packing around the anvil end (16) between the pipe (18) and the anvil end (16), thereby facilitating insertion under an immovable structure such as sewer or drainage pipes.

The anvil end (16) can be the same material as the central body (12), or a different material so long as the material selected can sustain repeated impacts to the side of the anvil end (16) opposite the central body (12).

Figure 2:
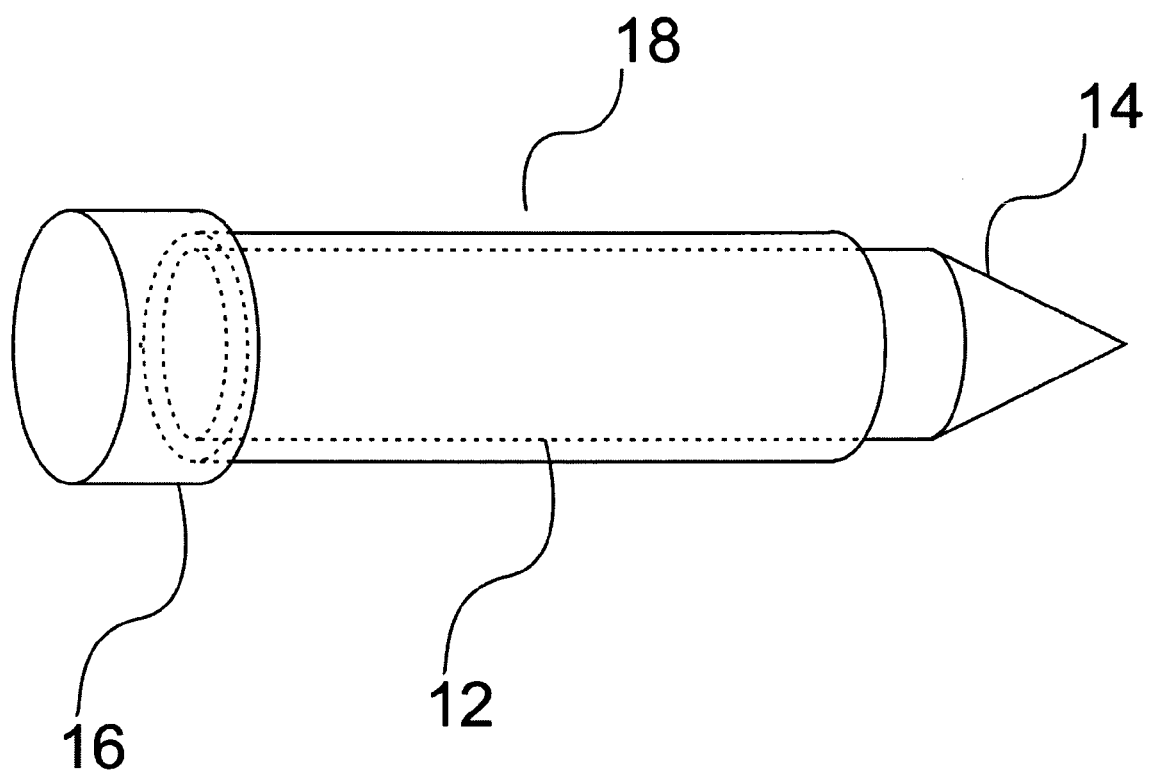
FIG. 2 depicts a perspective view of the tool of the present embodiment in a position ready for use in an installation.

FIG. 2 depicts a perspective view of the probe (10) with the anvil end (16), the central body (12), and the tapered end (14) with pipe (18) surrounding the central body along (12) a central axis. The anvil end (16), tapered end (14) and central body (12) are integral with each other, welded or otherwise non-removably connected together in this embodiment.

Figure 3:
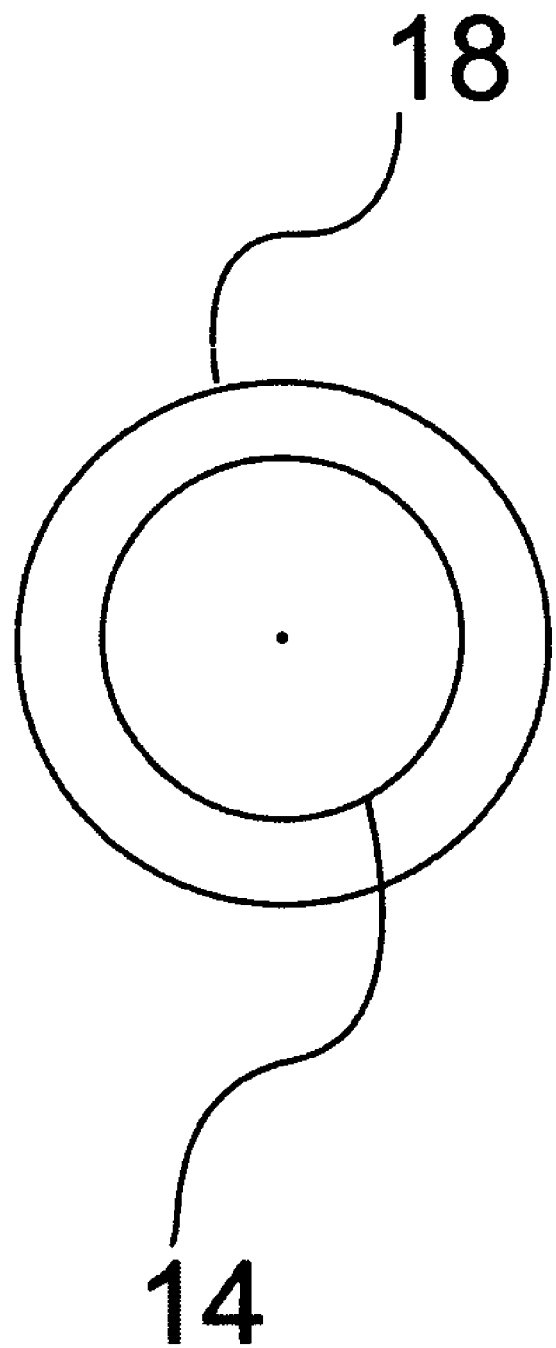
FIG. 3 depicts a front view of the tool viewing down the tapered end with the pipe disposed around the tool used in the present embodiment.

FIG. 3 depicts a front view of the probe (10) viewing down the tapered end (14) with the pipe (18) disposed around the central body (12).

Figure 4:
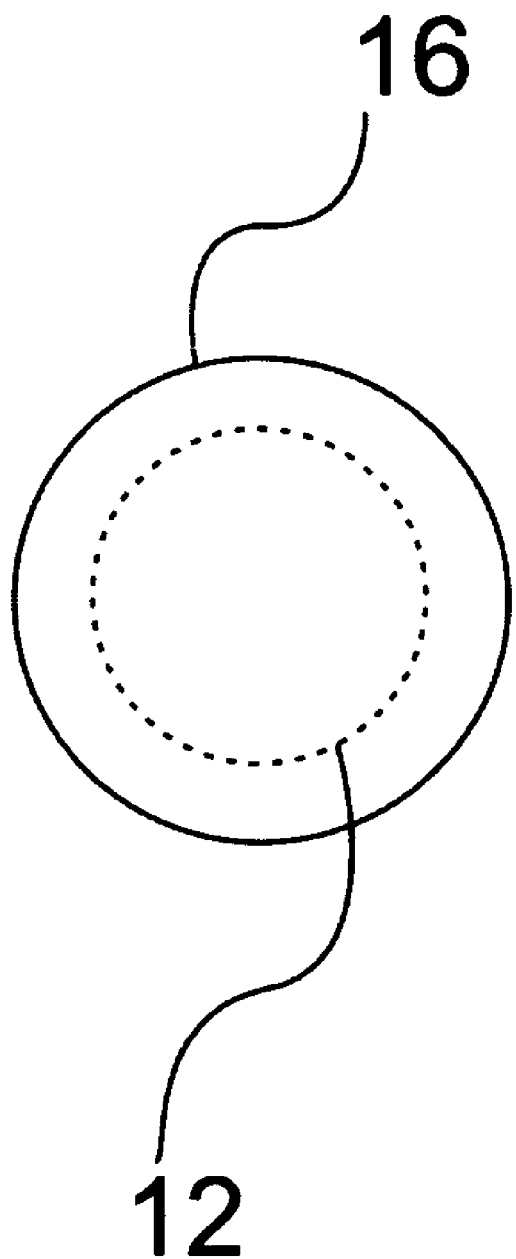
FIG. 4 depicts a rear view of the tool, from the anvil end of the tool.

FIG. 4 depicts a rear view of the probe (10), from the anvil end (16) of the probe showing a flat face of the anvil end with a depression for receiving a pneumatic packer head. The anvil end (16) of this embodiment has a diameter of at least 2 inches and a thickness sufficient to sustain repeated impact without deformation. In another embodiment, the anvil end (16) can have a diameter no greater than 3 times the diameter of the central body (12). In a preferred embodiment, the anvil end (16) has a diameter between 2 times and 2.5 times the diameter of the central body (12), such as a diameter of between 2 inches and 4 inches. It is also contemplated that the anvil end (16) is cylindrical in shape.

In an embodiment of the method, a user digs a narrow trench, which can be as narrow as 3 inches and as deep as 6 feet. The narrow trench is at an angle to an immovable structure like a sidewalk, such as between 60°-90° degrees from an edge of an immovable structure.

The user places a desired piece of pipe (18) snugly over the central body (12) of the probe (10) by sliding the pipe (18) over the integral tapered end (14) until the central body (12) was covered along the axis of the central body forming a pipe and probe assembly. For this embodiment, the pipe (18) has a diameter sufficient to releasably envelope the central body (12) without a sufficient gap, or much of a space. Also it should be noted that the pipe (18) is disposed around the central body (12) along the axis of the central body.

The tool, or the pipe and probe assembly, is placed in the narrow trench to traverse beneath or around an immovable structure, such as to go under a walkway upon completion of the installation.

The user can use a packer, such as electric packer or a hammer, to pound one side of the anvil end (16) of the probe (10) pushing the pipe and probe assembly into the soil beneath or traversing around the immovable structure.

Once the probe and pipe assembly are at the correct location, with the tapered portion of the probe (10) exposed or accessible after traversing the immovable structure, the probe (10) can be pulled from the anvil end (16) and reused. The pipe (18) is left in the ground.

In another embodiment, a second pipe, which is narrower than the installed pipe, can be fed into the installed pipe forming a double walled structure with enhanced insulation, particularly useful for colder climates. Alternatively, drip water tubing could then be fed into the installed pipe and run beneath the immovable structure.

This method enables an average 160 pound man in decent shape to install a 4.5 foot n 1 inch diameter PVC pipe in gumbo soil, such as the kind in Houston, Tex., in 30 seconds using a sledge hammer and this tool.

While these embodiments have been described with emphasis on the embodiments, it should be understood that within the scope of the appended claims, the embodiments might be practiced other than as specifically described herein.

What is claimed is:

1. A tool for installing pipe comprising:
   a. a probe comprising:
      i. a central body with an axis;
      ii. a tapered end; and
      iii. an anvil end connected to the central body; wherein the anvil end comprises tapered shoulders angled between the anvil end and the central body;
   b. a pipe adapted to fit flush over the central body;
      wherein the tool is inserted in the ground the anvil end is impacted until the tapered end is visible, and wherein the probe is removed leaving the pipe installed in the ground without particles in the pipe.

2. The tool of claim 1, wherein the pipe fits flush against the anvil end to prohibit particles from packing between the pipe and the central body.

3. The tool of claim 1, wherein the anvil end comprises a diameter of at least 2 inches and a thickness sufficient to sustain repeated impact without deformation.

4. The tool of claim 3, wherein the anvil end has a diameter of between about 2 inches and about 4 inches.

5. The tool of claim 1, wherein the anvil end comprises a diameter no greater than 3 times the diameter of the central body.

6. The tool of claim 4, wherein the anvil end has a diameter between about 2 times and about 2.5 times the diameter of the central body.

7. The tool of claim 1, wherein the anvil end is composed of a material selected from the group consisting of carbon steel, stainless steel, cold rolled steel, iron, alloys thereof, and combinations thereof.

8. The tool of claim 1, wherein the pipe comprises an inner diameter between about 0.5 inch and about 2.5 inches.

9. The tool of claim 1, wherein the probe is composed of a non-deformable material capable of sustaining impacts of at least 20 pounds per square inch.

10. The tool of claim 1, wherein the central body and the tapered end is composed of a high impact, ultraviolet resistant, non-corroding material.

11. The tool of claim 10, wherein the high impact, ultraviolet resistant, non-corroding material is selected from the group consisting of a polymer, a graphite, a ceramic, and combinations thereof.

12. The tool of claim 1, wherein the tapered end is a flat face.

13. The tool of claim 1, wherein the tapered end culminates in a point.

14. The tool of claim 1, wherein the pipe forms a housing for containing smaller diameter water tubing.

15. A method for installing piping for water systems beneath an immovable structure, wherein the method comprises the steps of:
   a. excavating a narrow trench adjacent the immovable structure at an angle to traverse the immovable structure;
   b. inserting a tool into the narrow trench, wherein the tool comprises a probe and a pipe adapted to fit flush over the probe, wherein the probe comprises a tapered end, a central body connected to the anvil end, and an anvil end connected to tapered shoulders angled between the central body and the anvil end, and wherein the pipe comprises a length that traverses the immovable structure;
   c. impacting the anvil end to drive the tapered end beneath the immovable structure until the pipe traverses the immovable structure; and
   d. removing the probe, thereby forming an installed water pipe for engagement with an water system.

16. The method of claim 15, wherein the installed pipe is connected to the water system.

17. The method of claim 15, wherein water piping is connected to the installed pipe for connection to the water system.

18. The method of claim 15, wherein the installed pipe is welded to the water system.

19. The method of claim 15, wherein the step of impacting is performed using an electrical packer, a hydraulic packer, a pneumatic packer, a manual packer, or combinations thereof.

20. A tool for installing pipe comprising:
   a. a probe comprising:
      i. a central body made from a material, wherein the central body comprises an axis;
      ii. a tapered end made from the material; and
      iii. an anvil end made from a different material connected to the central body;
   b. a pipe adapted to fit flush over the central body; and
      wherein the tool is inserted in the ground the anvil end is impacted until the tapered end is visible, and wherein the probe is removed leaving the pipe installed in the ground without particles in the pipe.

21. The tool of claim 20, wherein the pipe fits flush against the anvil end to prohibit particles from packing between the pipe and the graphite composite central body.

22. The tool of claim 20, wherein the anvil end comprises a diameter of at least 2 inches and a thickness sufficient to sustain repeated impact without deformation.

23. The tool of claim 22, wherein the anvil end has a diameter of between about 2 inches and about 4 inches.

24. The tool of claim 20, wherein the anvil end comprises a diameter no greater than 3 times the diameter of the central body.

25. The tool of claim 23, wherein the anvil end has a diameter between about 2 times and about 2.5 times the diameter of the central body.

26. The tool of claim 20, wherein the different material is selected from the group consisting of carbon steel, stainless steel, cold rolled steel, iron, alloys thereof, and combinations thereof.

27. The tool of claim 20, wherein the pipe comprises an inner diameter between about 0.5 inch and about 2.5 inches.

28. The tool of claim 20, wherein the material is a non-deformable material capable of sustaining impacts of at least 20 pounds per square inch.

29. The tool of claim 20, wherein the material comprises a high impact, ultraviolet resistant, non-corroding composite.

30. The tool of claim 29, wherein the high impact, ultraviolet resistant, non-corroding composite is selected from the group consisting of a polymer, a graphite, a ceramic, and combinations thereof.

31. The tool of claim 20, wherein the tapered end is a flat face.

32. The tool of claim 20, wherein the tapered end culminates in a point.

33. The tool of claim 20, wherein the pipe forms a housing for containing smaller diameter water tubing.

* * * * *